United States Patent
Nadell et al.

(10) Patent No.: US 7,519,060 B2
(45) Date of Patent: Apr. 14, 2009

(54) REDUCING INTER-PACKET GAPS IN PACKET-BASED INPUT/OUTPUT COMMUNICATIONS

(75) Inventors: David C. Nadell, San Jose, CA (US); Satishkumar P. Sampath, Milpitas, CA (US); Ronald L. Dammann, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 1122 days.

(21) Appl. No.: 10/391,961

(22) Filed: Mar. 19, 2003

(65) Prior Publication Data

US 2004/0184447 A1    Sep. 23, 2004

(51) Int. Cl.
*H04L 12/28*    (2006.01)
*H04L 12/56*    (2006.01)
(52) U.S. Cl. ............... 370/390; 370/389; 370/391
(58) Field of Classification Search ......... 370/389–394, 370/395.7, 395.71, 235, 229, 236.1, 432, 370/447, 461–462
See application file for complete search history.

(56) References Cited

U.S. PATENT DOCUMENTS

| | | | | |
|---|---|---|---|---|
| 5,583,992 A | * | 12/1996 | Kudo | 709/201 |
| 6,836,479 B1 | * | 12/2004 | Sakamoto et al. | 370/389 |
| 6,839,794 B1 | * | 1/2005 | Schober | 710/316 |
| 6,950,394 B1 | * | 9/2005 | Chou et al. | 370/229 |
| 7,031,258 B1 | * | 4/2006 | Frisch et al. | 370/235 |
| 7,058,053 B1 | * | 6/2006 | Schober | 370/390 |
| 7,102,999 B1 | * | 9/2006 | Sindhu et al. | 370/235 |
| 7,274,710 B2 | * | 9/2007 | Cummings et al. | 370/462 |
| 2002/0110086 A1 | * | 8/2002 | Reches | 370/235 |
| 2005/0147105 A1 | * | 7/2005 | Sano et al. | 370/395.7 |
| 2007/0067528 A1 | * | 3/2007 | Schaffer et al. | 710/116 |

OTHER PUBLICATIONS

Intel® InfiniBand* Architecture "Solutions for Developers and IT Managers" Brochure, 2002.

* cited by examiner

*Primary Examiner*—Hassan Kizou
*Assistant Examiner*—Chuong T Ho
(74) *Attorney, Agent, or Firm*—Trop, Pruner & Hu, P.C.

(57) ABSTRACT

In one embodiment, an interconnect device (e.g., a switch) includes an interface operably coupled to an interconnect logic capable of reducing inter-packet gaps in packet-based input/output communications. Based on, at least in part, a packet attribute associated with an inbound packet, the interconnect logic may determine an indication of transfer grant which may be issued in conjunction with a packet relay request, sending packet attribute information in advance of the packet attribute.

24 Claims, 13 Drawing Sheets

FIG. 5A  tx_gnt
FIG. 5B  rx_gnt
FIG. 5C  tx_data
FIG. 5D  rx_data

REDUCING INTER-PACKET GAPS IN PACKET-BASED INPUT/OUTPUT COMMUNICATIONS

BACKGROUND

This disclosure relates generally to data communications over interconnect infrastructure, and particularly to reducing inter-packet gaps in packet-based input/output (I/O) data communications.

In application processing and enterprise computing environments, high-end computing commonly involves interconnect technologies with a relatively greater capacity to move data between nodes, such as between data processor nodes and I/O devices for a variety of data servers and computers. Not only do such environments require higher bandwidth and lower latencies; better utilization of available bandwidth than is currently available is also desirable. For enabling a packet-based I/O data communication, an interconnect device, such as a switch having a receiver, a crossbar and a transmitter may be deployed to transfer data responsive to available transfer grants.

However, a receiver may not be able to take an immediate advantage of one or more grants because the receiver may be serving a different requester other than the requester that initiated the earlier request. Additionally, if more grants than necessary to transmit the packet are issued, they may be discarded, wasting the crossbar bandwidth. In a short packet case, as an example, a transmitter may queue up more grants in a grant pipeline than are needed to transmit a packet, wasting bandwidth since the excess grants may cause inter-packet gaps. While handling data communications, a certain time may elapse depending upon data packet latency involved on a data path from the receiver to the transmitter and grant latency present from the transmitter to the receiver. Therefore, even though a destination-lookup request for a next packet may be sent as soon as packet header information is received, the next packet must await a grant, effectively introducing an inter-packet gap within the switch. Inadvertently, the excess grant from the previous packet may be incorrectly used, sending the next packet to an incorrect destination, as a result.

Thus, there is a continuing need for better ways to reduce gaps between packets in packet-based input/output data communications, especially in a switch.

SUMMARY OF THE INVENTION

In accordance with some embodiments, inter-packet gaps in packet based input/output communications may be reduced by determining an indication of a transfer grant for an inbound packet by translating a packet attribute of the packet. A packet relay request is issued with the indication of transfer grant to provide packet attribute information in advance of the packet attribute.

DETAILED DESCRIPTION

Figure 1A:
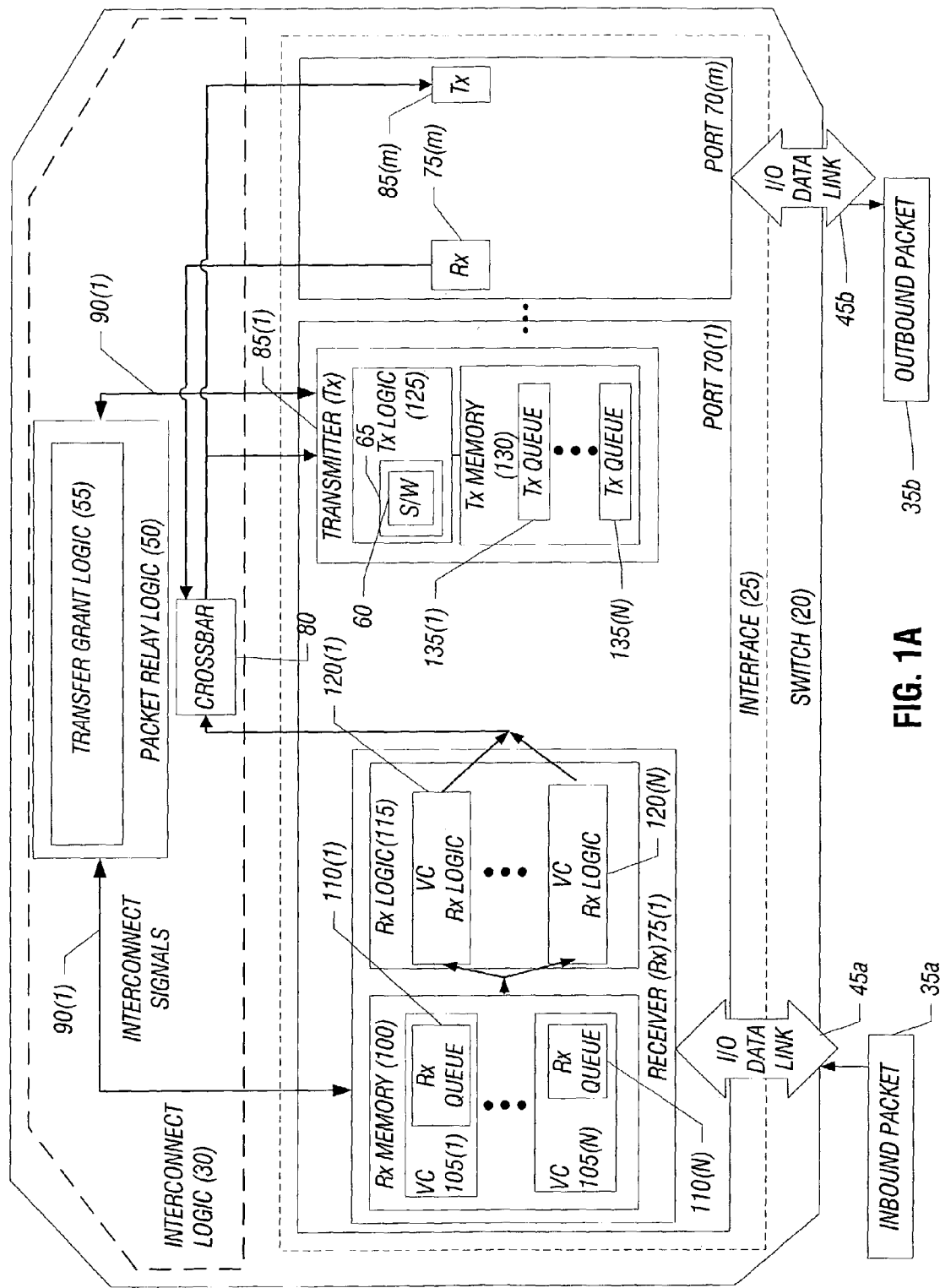
FIG. 1A is a schematic depiction of a switch in accordance with one embodiment of the present invention.

An interconnect device, such as a switch 20 shown in FIG. 1A includes an interface 25 operably coupled to an interconnect logic 30 capable of establishing a packet-based data input/output (I/O) communication according to one embodiment of the present invention. The interface 25 may receive an inbound packet 35a within the packet-based I/O data communication over an I/O data link 45a. The switch 20 may selectively route the inbound packet 35a as an outbound packet 35b over another I/O data link 45b based on a packet attribute associated with the inbound packet 35a. Using the I/O data links 45a, 45b, the switch 20 may connect one or more end node devices, such as processor-based devices and I/O devices, forming a network in some embodiments. Examples of the end node devices include single chip processor-based devices or Internet adapters and host computers, such as data servers in application processing and enterprise computing environments.

In operation, using the packet attribute the interconnect logic 30 may determine an indication of transfer grant for transferring the inbound packet 35a from the interface 25 to a desired destination. To this end, interface 25 may issue a packet relay request along with the indication of transfer grant, providing certain packet information in advance to the packet attribute which may hold packet length information, in some embodiments of the present invention.

Consistent with one embodiment of the present invention, the interconnect logic 30 may comprise a packet relay logic 50 which routes the inbound packet 35a, associated requests and grants for the data transfer on a word-by-word basis.

Specifically, the packet relay logic 50 may include a transfer grant logic 55 to grant bandwidth time-slots for transferring the entire inbound packet 35a. According to one embodiment of the present invention, the transfer grant logic 55 may incorporate software 60 in a storage device 65, storing a conventional packet relay routine for implementing a word-based granting process in the packet relay logic 50.

The interface 25 may further comprise ports 70(1) and 70(m). Each port 70 may include a receiver (Rx) 75 operably coupled to a crossbar 80. Besides the receiver 75, a transmitter (Tx) 85 may be operably coupled to the crossbar 80. In order to transfer the inbound packet 35a, the transmitter 85 may provide one or more packet transfer grants to the receiver 75 based on the indication of transfer grant, in some embodiments of the present invention. Upon receipt of the inbound packet 35a, the receiver 75 may extract from the packet attribute of the inbound packet 35a, packet information into the indication of the transfer grant, in one embodiment. Using the packet information, the crossbar 80 may transfer the inbound packet 35a to a destination port.

While handling packet-based I/O data communications, the receiver 75 may initiate a request to a destination port and wait for the transmitter 85 to respond to the request by granting one or more time slots (or time-slices of bandwidth). Specifically, a grant signal from the transmitter 85 to transfer a data packet word from the receiver 75 may enable the switch 20 to decide when to read the receiver 75 and drive data to the crossbar 80. For example, the receiver 75 may translate a packet length field of the inbound packet 35a into another field, conveying a number of word grants to be issued in response to the indication of transfer grant. To initiate a transfer of the inbound packet 35a from the receiver 75 to the transmitter 85, another field may be selectively used to generate one or more grant signals 90 for the receiver 75, in some embodiments of the present invention.

According to one embodiment, each receiver 75 may comprise a shared memory 100 to queue the inbound packet 35a. The shared memory 100 may be a random access memory (RAM) being shared by at least two virtual channels, in one case. Examples of the shared memory 100 include a dynamic random access memory (DRAM) and a static random access memory (SRAM). The shared memory 100 may further include a first buffer 105(1) associated with a first virtual channel (VC) and a second buffer 105(N) associated with a second virtual channel. While a first queue 110(1) of received packets may be stored in the first buffer 105(1) for the first virtual channel, the second buffer 105(N) may store a second queue 110(N) of the received packets in the second virtual channel, in one embodiment.

Of course, any one of the receivers 75(1) through 75(m) may communicate with any one of the transmitters 85(1) through 85(m) in the manner described next with respect to the receiver 75(1) and transmitter 85(1). More particularly, for a packet-based I/O communication the receiver 75(1) may further include a receiver logic 115, which may initiate a request to a destination port and wait for word grants from the transfer grant logic 55 before reading the shared memory 100. The receiver logic 115 may comprise a first virtual channel (VC) receiver (Rx) logic 120(1) and a second virtual channel receiver logic 120(N), each associated with the respective virtual channel queues. Each virtual channel receiver logic 120 may drive data, i.e., packets of data including the inbound packet 35a to the crossbar 80 in one embodiment. In response to receiving one or more word grants in the interconnect signals 90(1), both the virtual channel receiver logic 120(1), 120(N) may issue a corresponding packet relay request and respond with data to respective granting of these requests by the transmitter 85(1).

For responding to the packet relay requests, the transmitter 85(1) may include a transmitter logic 125 and a transmitter memory 130 granting one or more time slots (or time-slices of bandwidth). In one embodiment, the transmitter memory 130 may be a random access memory (RAM), storing a first transmit queue 135(1) and a second transmit queue 135(N), each associated with a different virtual channel of the receiver 75(1). While transmitting the inbound packet 35a, the first transmit queue 135(1) may enable the transmitter 85(1) to queue up grants in a grant pipeline. In the grant pipeline, grants may also be queued up for any of the inbound packets available for transfer. Such inbound packets may be propagated from a data pipeline of the first and second queues 110(1), 110(N) associated with respective virtual channels to the transmitter 85(1).

Figure 1B:
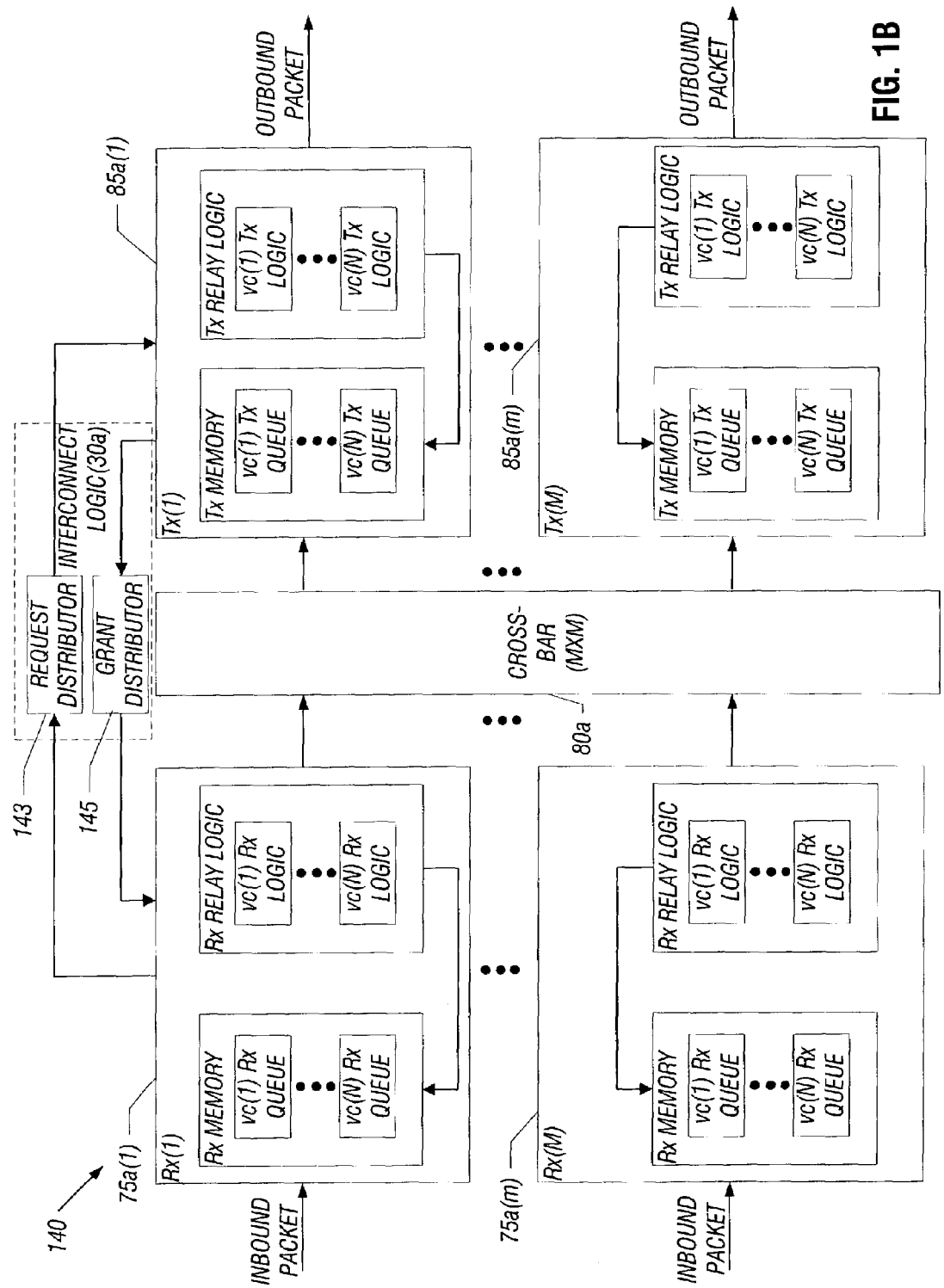
FIG. 1B is a schematic depiction of an interconnect switch in accordance with one embodiment of the present invention.

An interconnect switch 140 shown in FIG. 1B includes an interconnect logic 30a operably coupled to a plurality of receivers 75a(1) through 75a(m) to receive inbound packets which may be distributed via a crossbar 80a to a plurality of transmitters 85a(1) through 85a(m), in a packet-based data input/output (I/O) communication according to one embodiment of the present invention. The interconnect logic 30a may comprise a request distributor 143 and a grant distributor 145. Using the crossbar 80a, the interconnect logic 30a may selectively route the inbound packets from the receivers 75a(1) through 75a(m) to the intended transmitters 85a(1) through 85a(m), for example based on a packet attribute associated with an inbound packet in some embodiments of the present invention.

The request distributor 143 may receive requests from the receivers 75a(1) through 75a(m) for relaying an inbound packet to the destination, such as to the transmitter 85a(1). To this end, the grant distributor 145 may issue grant indications to the receiver 75a(1) for the transmitter 85a(1) based on the packet attribute of the inbound packet, which may hold packet length information, in many embodiments of the present invention. In this manner, the interconnect logic 30a using the request distributor 143 and the grant distributor 145 may transfer the inbound packet via the crossbar 80a to a desired destination. For example, the crossbar 80a may be a (M×M) switch. As described above, the interconnect logic 30a may transfer inbound packets in a packet-based data input/output (I/O) communication without introducing an inter-packet gap.

Figures 2, 3A:
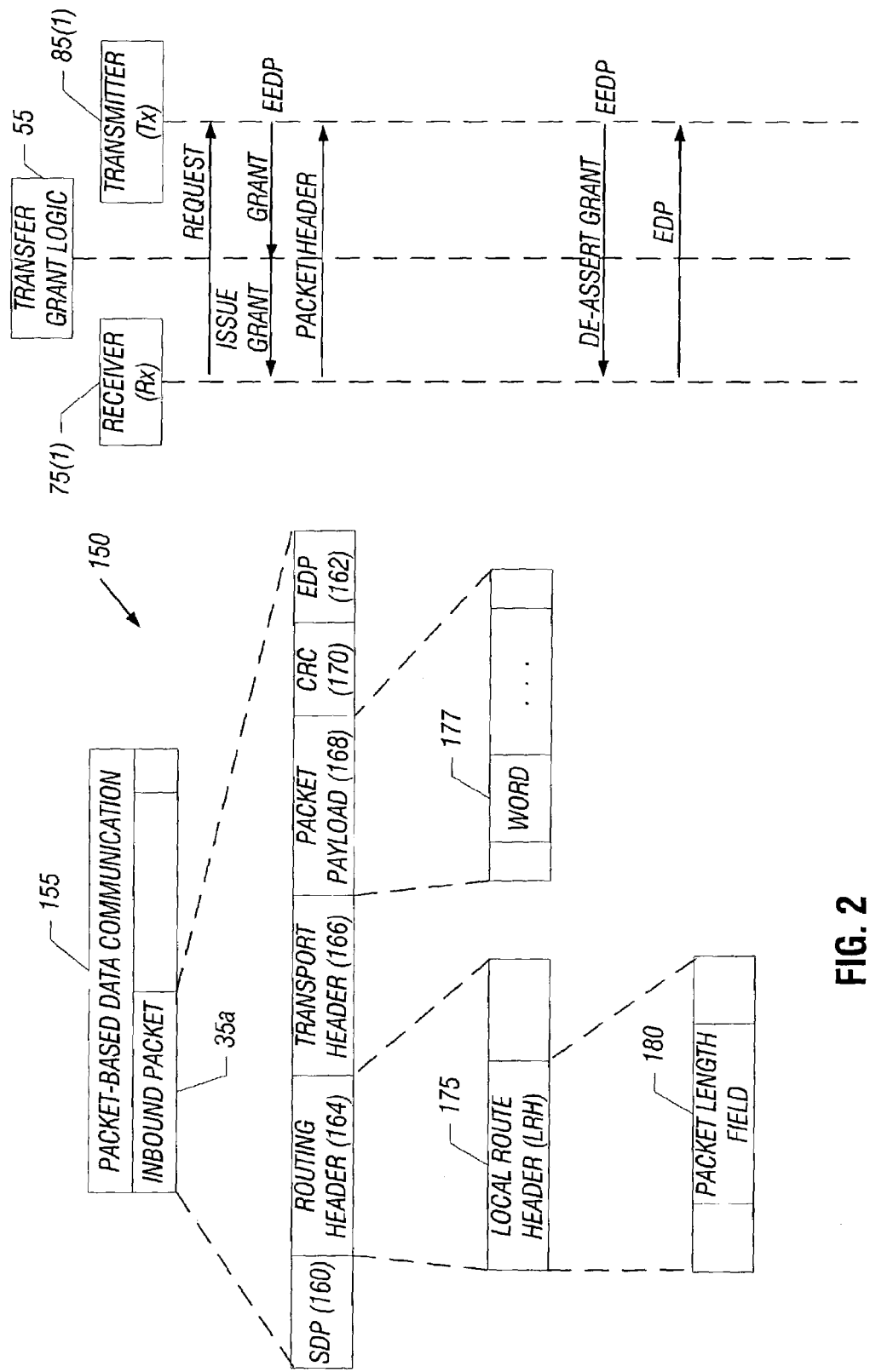
FIG. 2 shows a packet format in packet-based data communications in accordance with one embodiment of the present invention.
FIG. 3A is an interaction of a receiver and a transmitter shown in FIG. 1A consistent with one embodiment of the present invention.

A packet format 150 is shown in FIG. 2 for the inbound packet 35a to carry I/O message data within a packet-based data communication 155, according to one embodiment of the present invention. The inbound packet 35a may comprise a start data packet (SDP) 160 and an end data packet (EDP) 162 according to one embodiment. In addition, a routing header 164 and a transport header 166 may be included as well. A packet payload 168, a cyclic redundancy check (CRC) data 170 may further be provided in the inbound packet 35a.

The routing header 164 may contain a local route header (LRH) 175 that may govern appropriate routing of the inbound packet 35a through the switch 20 (FIG. 1A) and thereafter, e.g., within a subnet. As typically is the case, the subnet may include one or more associated links, such as the data I/O links 45a, 45b (FIG. 1A) that share a common identification and a manager. Of course, one or more subnets may be connected to each other via routers in one embodiment, forming a network.

The packet payload 168, like any data communication, encompasses units of data, for example in the form of a word 177 for transferring information from a source to a destination over an interconnect fabric connecting one or more end node devices according to one embodiment. The interconnect fabric may be a collection of physical links, switches, and routers that connect together multiple end node devices in some embodiments. However, channel adapters may terminate each data I/O link 45 and execute transport-level functions for these end node devices.

At some point, the inbound packet 35a may be relayed from the receiver 75(1) via the crossbar 80 to the transmitter 85(1), as shown in FIG. 3A, consistent with one embodiment of the present invention. In one embodiment, the receiver 75(1) may provide the start data packet 160 and packet header information including the local route header 175 to the transmitter 85(1). By detecting an early end of the inbound packet 35a, i.e., prior to receiving the end data packet 162 at the transmitter 85(1), the grant signal 90(1) is deasserted, essentially eliminating gaps between packets sent from the shared memory 100 of the receiver 75(1) to the transmitter memory 130, in some embodiments.

Specifically, using an early end data packet (EEDP) mark indication from the transmitter 85(1) to the receiver 75(1) corresponding to the inbound packet 35a, a substantive reduction in inter-packet gaps, if not elimination thereof, may be achieved in the switch 20, such as a cut-through switch (of a non-store and forward type) in one embodiment. The packet length field 180 may be derived from the local route header 175 to provide the EEDP mark indication. As an example, the EEDP mark indication may be generated "n" words before the end data packet 162 is received at the transmitter 85(1). In one embodiment, the "n" words correspond to a number of words that may be determined based on the data and grant latencies between the receiver 75(1) and the transmitter 85(1). In other embodiments, a different criteria may be applied to determine the value of "n."

For example, if the data latency from the receiver 75(1) to the transmitter 85(1) is three clock cycles while the grant latency from the transmitter 85(1) to the receiver 75(1) is two clocks, then from the moment the end data packet 162 is sent from the receiver 75(1) to the time when a signal in the interconnect signals 90(1) is deasserted on the receiver 75(1), six clock cycles may elapse. Accordingly, the EEDP mark indication may be generated when only six words may be remaining to be received at the transmitter 85(1) for the inbound packet 35a.

Before the last six words are propagated from the receiver 75(1) to the transmitter 85(1), the EEDP indication may be provided by the transmitter 85(1), deasserting the grant signal in the interconnect signals 90(1) to the transfer grant logic 55. In turn, the transfer grant logic 55 issues a grant for the last six words. By anticipating exactly when the receiver 75(1) will send the end data packet 162, a last grant indication from the transmitter 85(1) results in the receiver 75(1) sending the end data packet 162, if no other packet is to be received at the transmitter 85(1). While the next packet may be issued, for example, six clock cycles earlier than conventionally possible on the receiver 75(1) side, a grant signal in the interconnect signals 90(1) for the next packet may be asserted six clocks earlier on the transmitter 85(1) side, without introducing an inter-packet gap of six clock cycles, in one case.

Figure 3B:
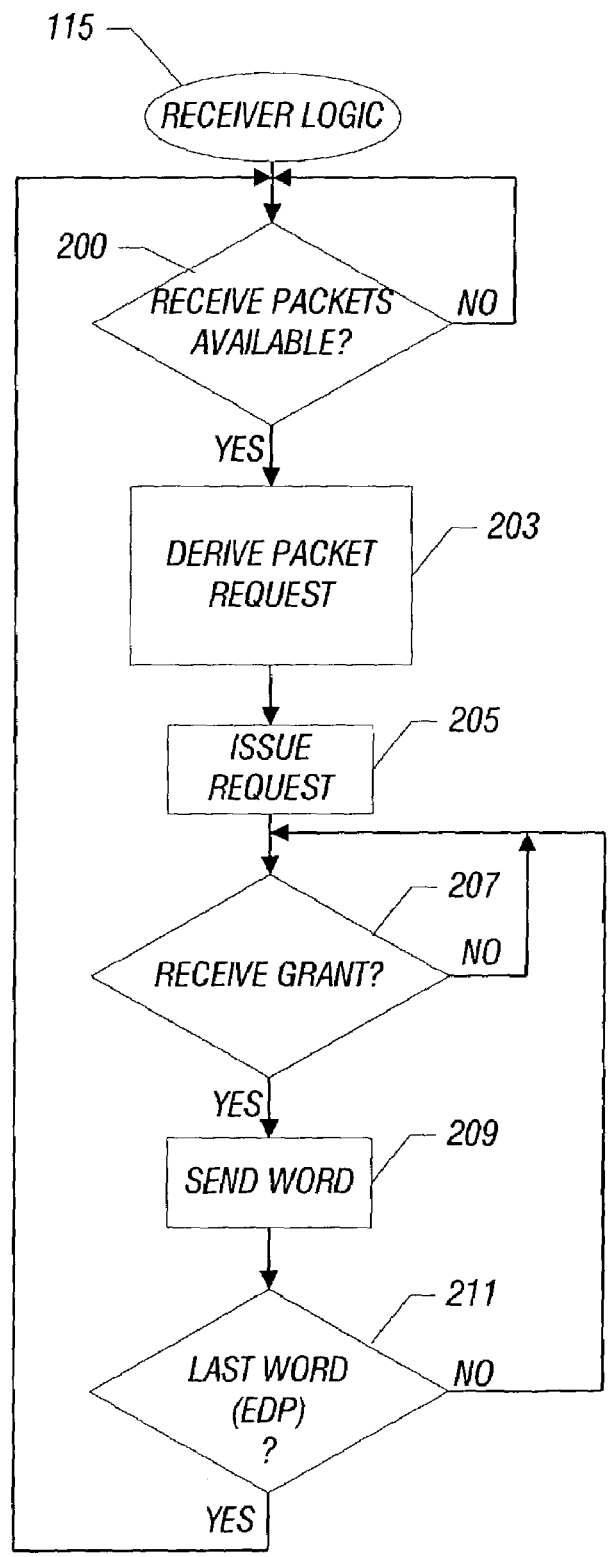
FIG. 3B is a flow chart for the receiver logic in the switch shown in FIG. 1A in accordance with one embodiment of the present invention.

Turning to FIG. 3B, an interaction is depicted between the receiver logic 115 and the transmitter logic 125 within the switch 20 shown in FIG. 1A, according to one embodiment of the present invention. At diamond 200, the receiver logic 115 may check whether or not one or more data packets are available for transfer. The receiver logic 115 in one embodiment may iteratively detect receipt of an inbound packet, such as the inbound packet 35a. The packet relay request may be derived for the inbound data packet 35a, which may be a first packet received at the receiver logic 115, at block 203. Thereafter, the packet relay request associated with the first packet may be issued at block 205.

The transmitter logic 125 may receive the issue request from the receiver logic 115 for the first packet and at least one packet attribute, such as the packet length included in packet header information (e.g., in local route header 175). In response to the issue request, the transmitter logic 125 may issue a grant indication to the receiver logic 115. Specifically, a packet grant may be asserted for the first packet.

In response, the receiver logic 115 at diamond 207 may ascertain whether or not a grant is available from the transmitter logic 125. If no grant is received at the receiver (e.g., receiver 75(1)), the receiver logic 115 may iterate, to accepting any grants issued by the transmitter logic 125 in some embodiments of the present invention. However, if a grant indication is received for the first packet at the receiver logic 115 at diamond 207, the receiver logic at block 209 may send one or more words for the first packet in a packet-based data communication.

Another check at diamond 211 may indicate whether a last word is issued for the first packet, indicating an end data packet (EDP). When the last word is issued for the first packet at the diamond 211, the receiver logic 115 may become available to receive another packet, for example the inbound packet 35a, comprising one or more words consistent with some embodiments of the present invention. Conversely, if the last word is not reached for the first data packet at the diamond 211, the receiver logic 115 may continue to receive grant indications from the transmitter logic 125.

Figure 3C:
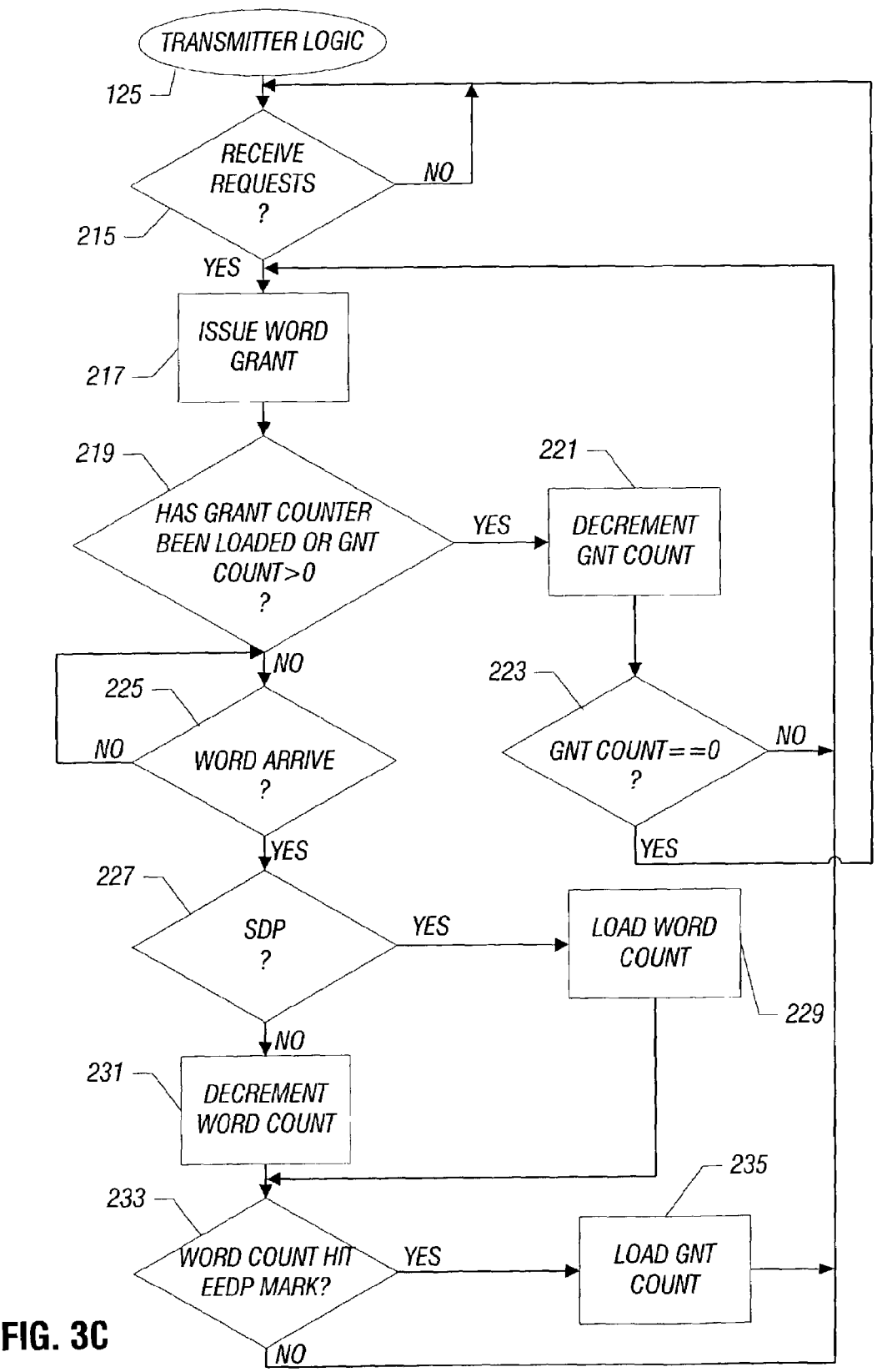
FIG. 3C is a flow chart for the transmitter logic in the switch shown in FIG. 1A in accordance with one embodiment of the present invention.

Turning now to FIG. 3C, the transmitter logic 125 at diamond 215 may check for any requests for packet relays from the receiver logic 115, in accordance with some embodiments of the present invention. When a request for packet relay is received at the transmitter logic 125 from the receiver logic 115, the transmitter logic 125 may issue a word grant including one or more grant indications depending upon the data packet for which the request for packet relay is received at block 217. Otherwise, at the diamond 215, the transmitter logic 125 in one embodiment may iterate, accepting the requests for packet relay from the receiver logic 115, in some embodiments.

Another check at diamond 219 may ascertain whether a grant counter has been loaded or a grant (GNT) count is issued at block 217 by the transmitter logic 125. If either the grant counter is loaded or a grant count is issued, the transmitter logic 125 may decrement the grant count at block 221. A check at diamond 223 may determine whether the grant count is exhausted. When the grant count is still available at the diamond 223, the transmitter logic 125 may continue to issue additional word grant for the first packet, as shown at block 217.

A check at diamond 225 may determine whether a word has arrived at the transmitter 85(1). In case the word is available, another check at diamond 227 may ascertain whether the word indicates a start data packet (SDP). However, if at the diamond 225 no word has yet arrived for the first packet, the transmitter logic 125 may iteratively check for the arrival of a word corresponding to that packet.

When a start data packet (SDP) is indicated at the diamond 227, a word count for the received packet may be loaded in a word counter at block 229, keeping the count of the words associated with the received packet in one embodiment of the present invention. However, if it is not the start data packet, the word count may be decremented at block 231. A check at diamond 233 then may determine when the word count hits the EEDP mark. In one embodiment, the EEDP mark represents a certain number of last words of a packet the receiver logic 115 ideally be sending by accepting every single grant issued by the transmitter logic 125. When the EEDP mark is reached, a grant (GNT) count may be loaded in a grant counter at block 235 in some embodiments of the present invention. However, until the word count hits the EEDP mark, the transmitter logic 125 may continue to issue word grant as shown in the block 217.

Figure 3D:
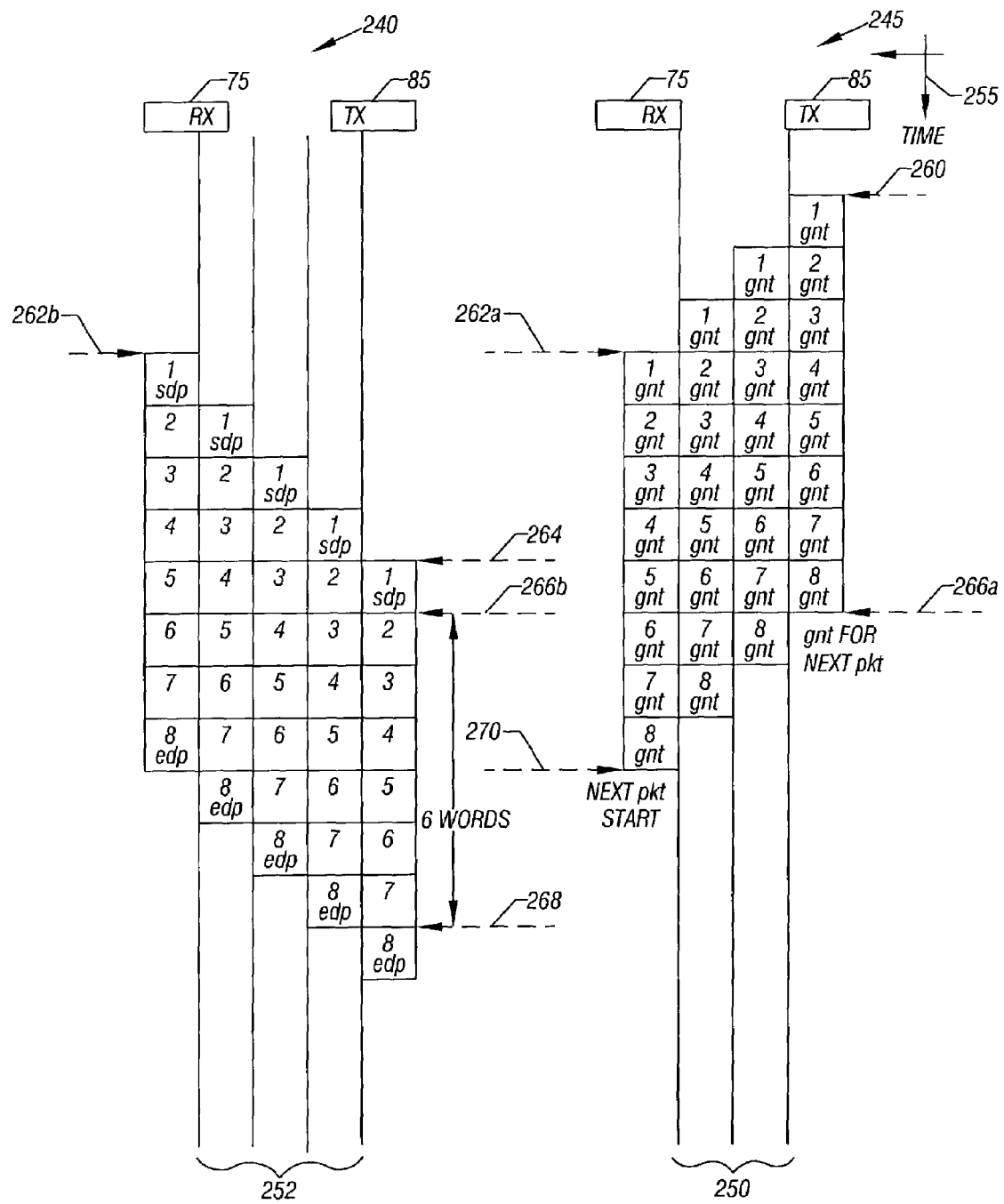
FIG. 3D is a depiction of a data pipeline and a grant pipeline illustrating elimination of inter-packet gaps according to one embodiment of the present invention.

A data pipeline 240 and a grant pipeline 245 are shown in FIG. 3D illustrating elimination of inter-packet gaps within the switch 20 (FIG. 1A), according to one embodiment of the present invention. While the grant pipeline 245 is depicted with a grant latency 250 of two memory or clock cycles, the data pipeline 240 is shown with a data latency 252 of three memory or clock cycles, as an example. Both the data pipeline 240 and the grant pipeline 245 are drawn in reference to a time axis 255. In response to a packet relay request from the receiver 75, the transmitter 85 provides a first grant 260 for a first packet, i.e., the inbound packet 35a comprising six words.

In this example, an early end detection may occur six words before the end data packet is issued. Specifically, due to the grant latency 250 the first grant 260 may arrive at the receiver 75 after two memory/clock cycles as indicated by a first grant reach stage 262a. In response to the first grant reach stage 262a, a first start data packet transfer 262b may be undertaken, indicating an issuance of a first word as a start data packet (SDP) at receiver 75 within the data pipeline 240. After the data latency 252 of three memory/clock cycles, the first word, i.e., the start data packet may reach the transmitter 85 at a first packet reach stage 264a.

Because an early end may be detected on the transmitter 85 side at least six words before the end data packet is to be sent, the first grant 260 for the first packet may be deasserted at a deassertion stage 266a in the grant pipeline 245. Additionally, a grant for a next packet may be asserted as well in one embodiment. From the SDP of the first packet, a word grant indication may be provided at a word grant stage 266b, for example, six words before an end data packet stage 268 in the data pipeline 240. After the grant latency 250 of two memory/clock cycles, a next packet start indication 270 for the next packet may be provided at the receiver 75, as shown in the grant pipeline 245 in order to initiate a transfer of the next packet.

Figure 4:
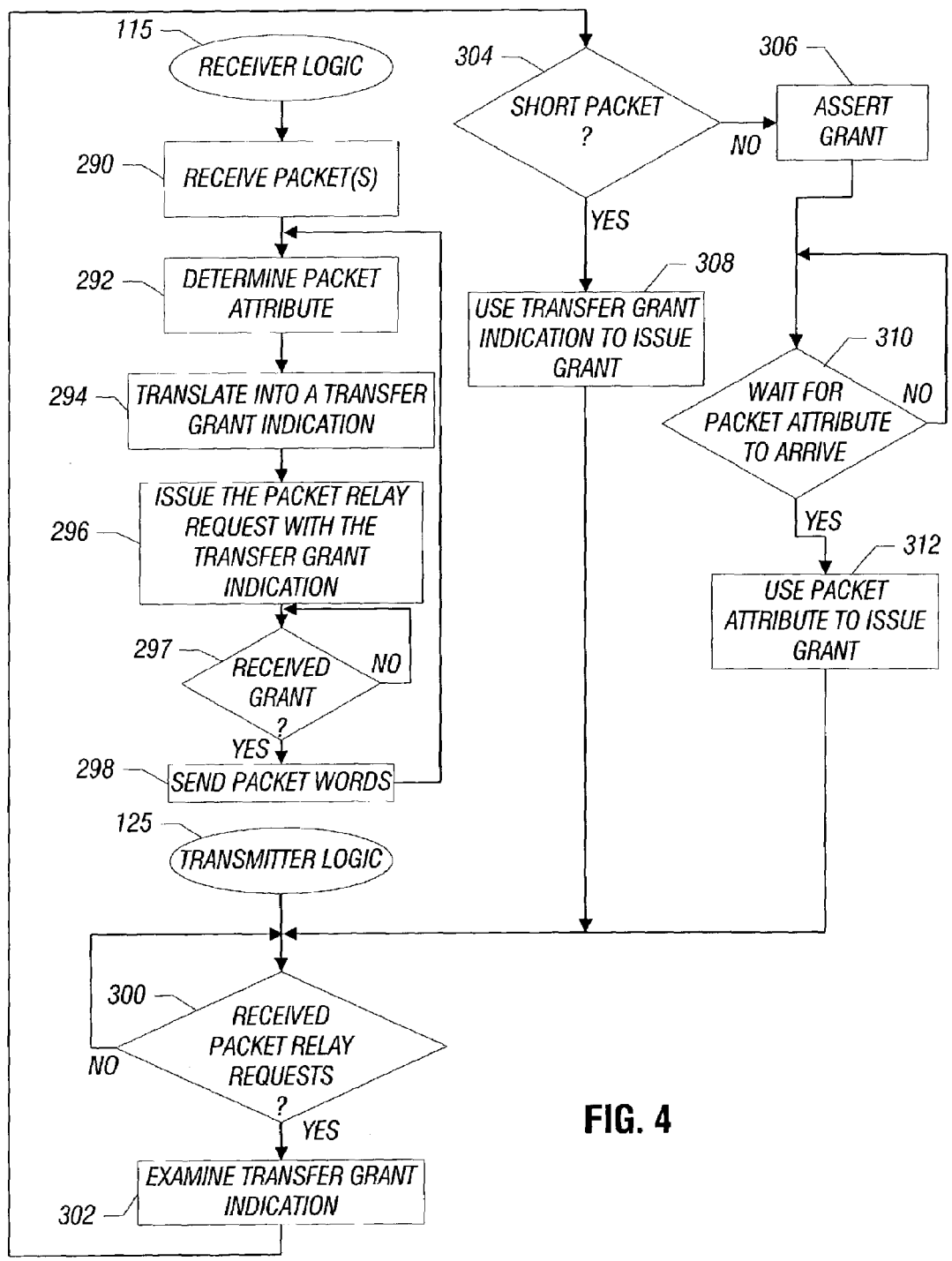
FIG. 4 is a flow chart for receiver and transmitter logic in the switch shown in FIG. 1A in accordance with one embodiment of the present invention.

Another interaction between the receiver logic 115 and the transmitter logic 125 is depicted in FIG. 4 for the switch 20 shown in FIG. 1A consistent with an embodiment of the present invention. At block 290, one or more packets, such as the inbound packet 35a may be received at the switch 20 in a packet-based data communication. The receiver logic 115 may determine a packet attribute, such as the packet length field 180 (FIG. 2) for the inbound packet 35a at block 292. Thereafter, the receiver logic 115 may translate the packet attribute into an indication of transfer grant for the packet at block 294, conveying information regarding how grants are to be issued. At block 296, a packet relay request may be issued with the indication of transfer grant, providing the in advance packet length information to the transmitter logic 125 before the packet attribute, i.e., the packet length field information reaches the transmitter logic 125. For example, the packet length field 180 may be 11-bit long which may be translated into a 4-bit field containing in advance packet length information. At diamond 297, a check may determine whether a grant is received. If a grant is not available, the receiver logic 115 may continue to look for the grant.

However, when a grant is received, as indicated by the diamond 297, at block 298, the receiver logic 115 may send a word of the received packet for which the in advance packet length information along with a packet relay request has been provided. On a word-by-word basis, the inbound packet 35a may be sent to the transmitter logic 125, at the block 298, including the packet length field 180 obtained from the local route header 175 (FIG. 2).

Having a particular packet length information in advance to the complete packet attribute information, e.g., 4-bit length information, the transmitter logic 125 may assert the exact number of grants desired even before the packet length field 180 of the local route header 175 arrives as the 11-bit length field, avoiding grant wasting. However, the receiver logic 115 only indicates a short packet length in the 4-bit length information when it is capable of using all grants to complete the packet transfer. Otherwise, the receiver logic 115 discards the resulting excess grants for the short packet and simply use the packet attribute in one embodiment.

By issuing a short-packet request only if it can use all grants asserted by a destination port, crossbar bandwidth of the crossbar 80 (FIG. 1) may be appropriately utilized without wasting the crossbar bandwidth in some embodiments. In particular, for a case where the number of memory/clock cycles needed to relay a packet is fewer than the inherent number of cycles needed to propagate data and word grants between the receiver logic 115 and the transmitter logic 125, increased throughput may be obtained for a short packet case, in one embodiment. However, if the receiver logic 115 cannot guarantee using all grants for a short packet then, the packet relay request is issued indicating a long packet, i.e., advance packet information is either not provided or simply not used. In such a case, the resulting excess grants corresponding to the long packet may be ignored.

At diamond 300, the transmitter logic 125 may check for the receipt of the packet relay request along with the transfer grant indication. Because the receiver logic 115 asserts the 4-bit field as part of the packet relay request, the transmitter logic 125 may derive the exact number of grants indicated in the 4-bit field by examining the transfer grant received in addition to the packet relay request at block 302 when the packet relay request is indicated at the diamond 300. In one embodiment, the transmitter logic 125 may count the number of grants indicated in the 4-bit field. The transmitter logic 125 may iterate, accepting any available packet relay requests.

At diamond 304, a check may determine whether the received packet is a short packet or a long packet based on the 4-bit field. If the 4-bit field indicates that the received packet is a long packet then, the transmitter logic 125 uses the packet attribute, i.e., the packet length information from the local route header 175 is used when it arrives over a data path at block 306. Conversely, if the 4-bit field indicates a short packet then, the indication of transfer grant may be used to transfer the packet at block 308 instead. A check at diamond 310 may ascertain if any additional packets are to be transferred; however, if there are no packets that need transferring, the flow ends. Alternatively, if another packet is to be transferred, the transmitter logic 125 may iteratively process that packet or other incoming packets in the packet-based data communications accordingly.

Figure 5:
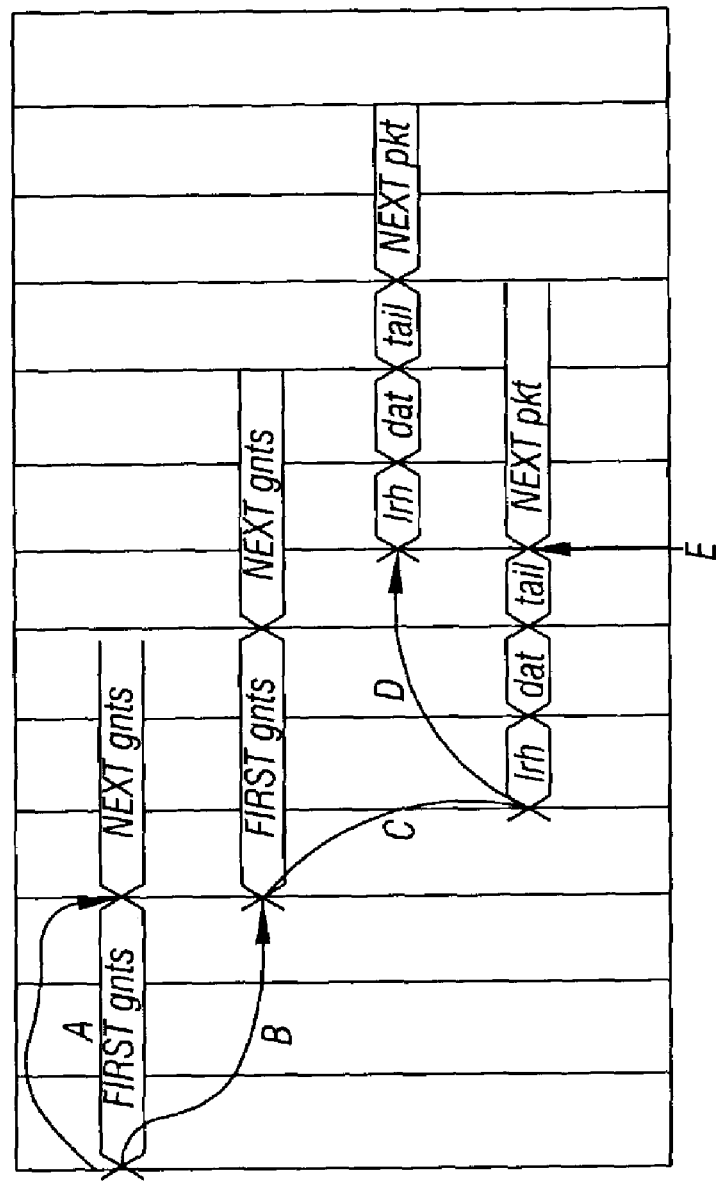
FIGS. 5A through 5D show timing charts for a short packet case in which word granting is used in the switch shown in FIG. 1A consistent with one embodiment of the present invention.

Next timing charts are shown in FIGS. 5A-5D for a short packet case in which word granting is used for the switch 20 shown in FIG. 1A consistent with one embodiment of the present invention. In particular, FIG. 5A shows a transmit grant (tx_gnt) signal of the interconnect signals 90(1) (FIG. 1) from the transmitter logic 125. Timing of a receive grant (rx_gnt) signal of the interconnect signals 90(1) reaching at the receiver logic 115 is shown in FIG. 5B. Relaying of data, including packets from the receiver logic 115 to the transmitter logic 125 is shown in FIG. 5C as a transmit data (tx_data) signal. A receive data (rx_data) signal shows the propagation of the data from the receiver logic 115 to the transmitter logic 125 in FIG. 5D.

As shown in FIG. 5A, a transition "A" indicates that the transmitter logic 125 may determine at the time of the packet relay request, a number of cycles for which the transmit grant signal may be asserted, for the inbound packet 35*a*, as an example. Particularly, first grants may be provided for the inbound packet 35*a* which may be for the first data packet in one embodiment. Likewise, next grants may be provided for the next packet.

A transition "B" indicates that the receive grant signal may propagate from the transmitter logic 125 to the receiver logic 115. Responding of the receiver logic 115 to one or more grants in the receive data signal is indicated by a transition "C" in which the receiver logic 115 may relay data including the inbound packet 35*a* to the transmitter logic 125. Data propagation from the receiver logic 115 to the transmitter logic 125 in the transmit data signal is indicated by a transition "D." The data may include the inbound packet 35*a* comprising the local route header 175, packet payload data 168, and tail data indicating the end data packet 172. Since the transmitter logic 125 may assert the exact number of grants needed for the inbound packet 35*a* based on the in advance packet length information included in the 4-bit length information, the next packet may follow immediately after the inbound packet 35*a*, as shown by an arrow "E" in FIG. 5D, which may result in elimination of inter-packet gaps in a packet-based input/output communications.

Figure 6:
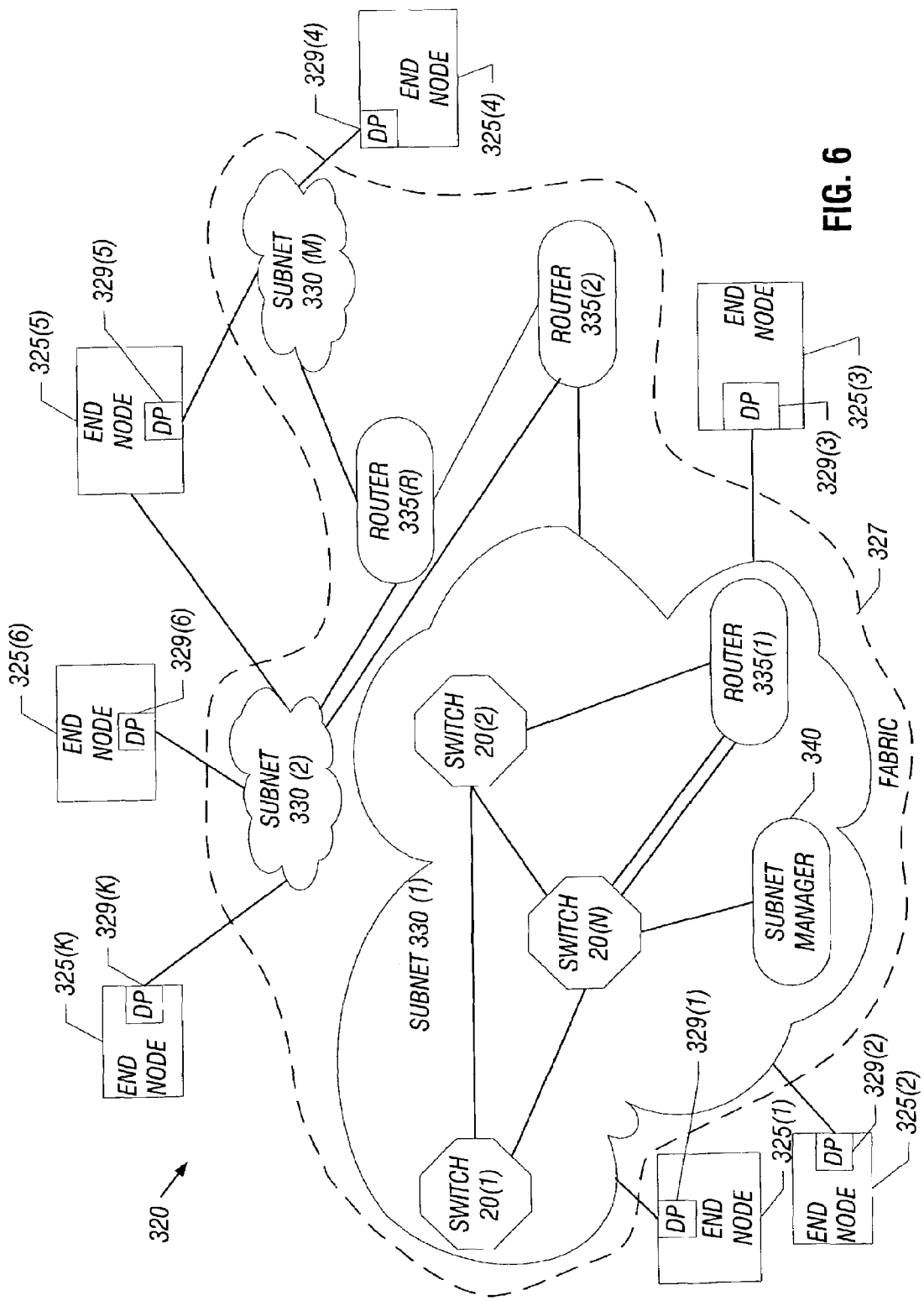
FIG. 6 is a depiction of a system area network that includes the switch shown in FIG. 1, according to one embodiment of the present invention.

A system area network (SAN) 320, as shown in FIG. 6, includes multiple end node devices 325(1) through 325(K) that may communicate by exchanging packets of data according to one embodiment of the present invention. Examples of the end node devices may include independent processor platforms (i.e., host processor nodes) and I/O platforms. For exchanging packets of data, a fabric 327 being a collection of links, switches and routers may communicatively connect the end node devices 325(1)-325(K), in one embodiment of the present invention. To communicate, each end node device 325 may include an associated destination port 329. In one embodiment, a destination port 329 is a location to which a link connects from the fabric 327, interconnecting all the end node devices 325(1) through 325(K). The fabric 327 may further include subnets 330(1)-330(M). Moreover, routers 335(1)-335(K) may be provided connecting the subnets 330 in addition to switches 20. In particular, subnet 330(1) comprises switches 20(1) to 20(N). A subnet manager 340 may control the subnet 330(1) while provisioning for various configurations in some embodiments.

In one embodiment, the SAN 320 may be in compliance with Infiniband architecture (IBA) specification, as set forth by the Infiniband Trade Association in a specification entitled, "Infiniband Architecture, Vol. 1: General Specifications," Release 1.0, published in June 2001. Using this architecture, the SAN 320 may be independent of the host operating system (OS) and processor platform. Because the IBA architecture is designed around a point-to-point architecture, the fabric 327, such as a switched I/O fabric may interconnect end node devices 325 via switches 20. The end node devices 325 may range from relatively simple I/O devices to very complex host devices.

In one specific example, an IBA-compliant switched I/O fabric may provide a transport mechanism for messages and queues for delivery between end node devices 325. The switched I/O fabric may be based on the way input and output connections are constructed between multiple host and targets in one embodiment. Using the channel-based I/O model of mainframe computers, channels may be created by attaching host channel adapters and target channel adapters through switches 20 in one embodiment. For instance, while the host channel adapters may serve as I/O engines located within a server, the target channel adapters may enable remote storage and network connectivity into the switched I/O fabric.

Figure 7A:
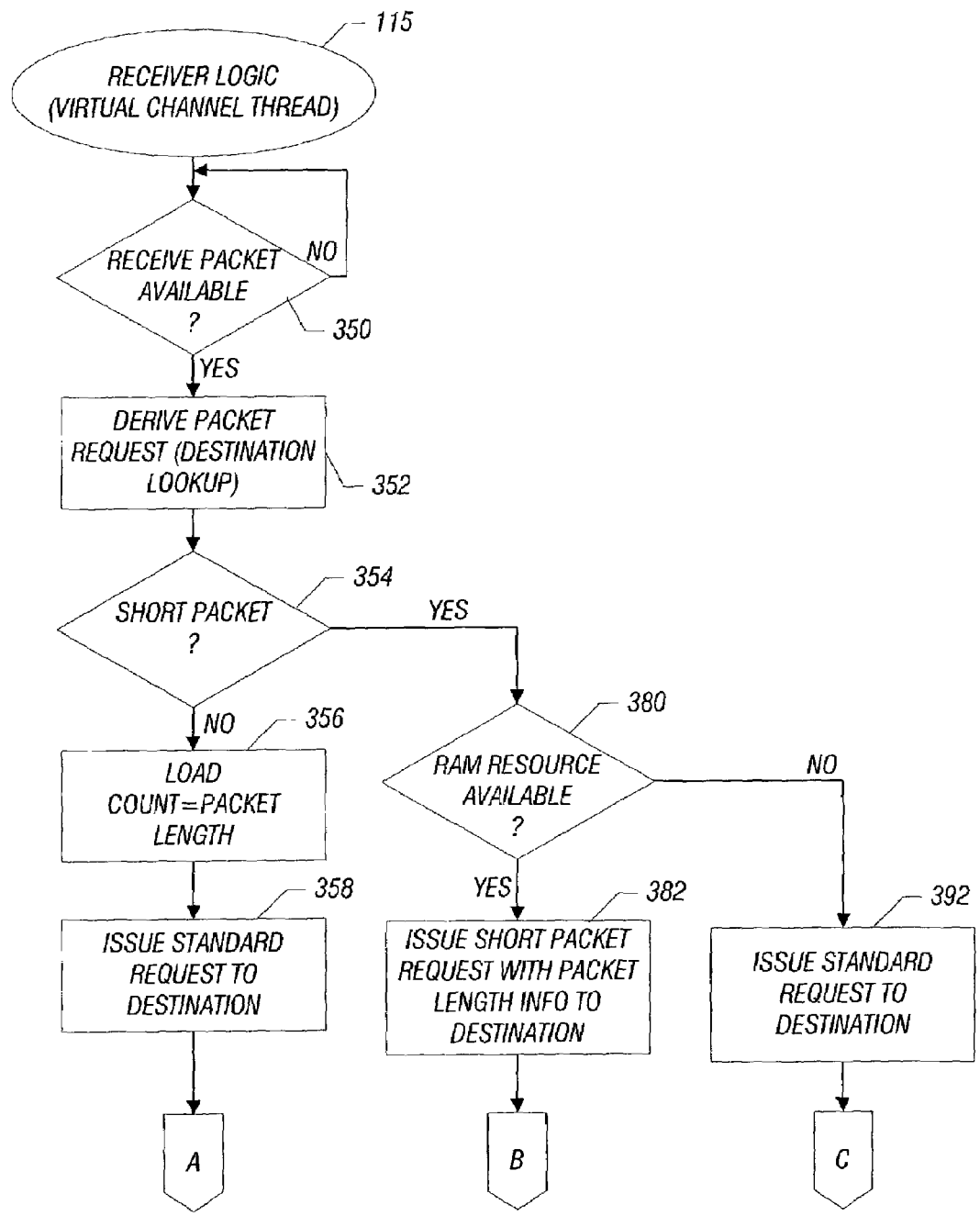
FIG. 7A is a flow chart for one execution thread of a single virtual channel corresponding to the receiver logic in the switch shown in FIG. 1A in accordance with one embodiment of the present invention.

Referring to FIG. 7A, one execution thread corresponding to the receiver logic 115 of a single virtual channel, such as the virtual channel (VC)105(1) is shown in accordance with one embodiment of the present invention. A check as to the availability of a packet at the receiver 75(1) at diamond 350 may indicate whether a packet is available for transfer. In one embodiment, the receiver 75(1) iteratively may observe the I/O data link 45*a* to check the availability of the inbound packet 35*a*. When the inbound packet 35*a* is indicated to be available at the diamond 350, at block 352, the receiver logic 115 may perform a destination look-up to derive a packet request. Another check at diamond 354 may indicate whether the received packet is a short packet. If the packet is determined not to be a short packet, at block 356, a counter for a load count, may be initialized using the packet length derived from the received packet. Thereafter, at block 358 the request for packet relay to the intended transmitter, for example, to the transmitter 85(1) shown in FIG. 1, may be issued. Specifically, the request for packet relay may be sent to the destination transmitter logic 125 shown in FIG. 1. In response to the packet relay request, the transmitter logic 125 may send a grant to the receiver logic 115.

Figure 7B:
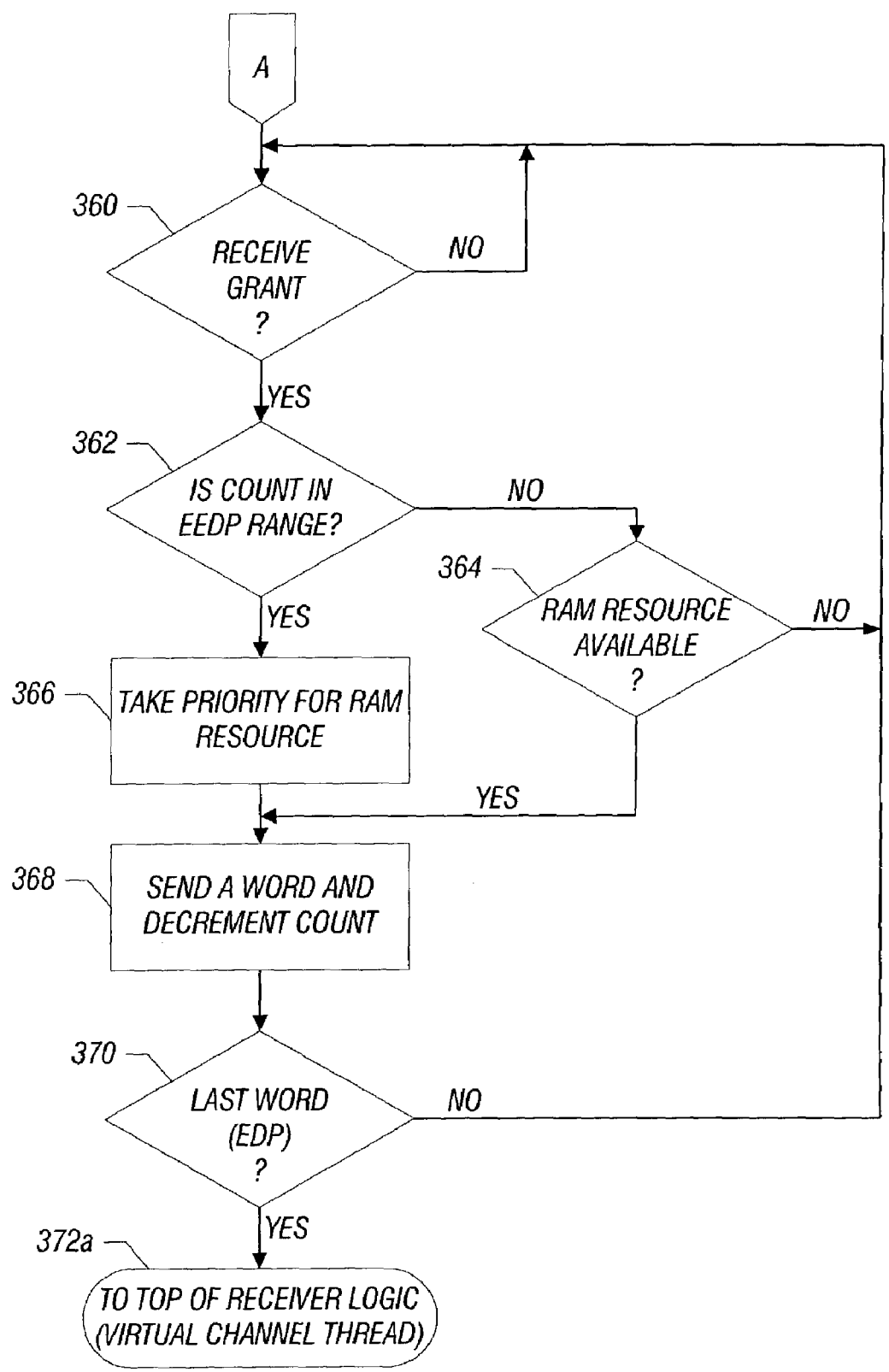
FIG. 7B is a flow chart for one execution thread of a single virtual channel corresponding to the receiver logic in the switch shown in FIG. 1A in accordance with one embodiment of the present invention.

Turning now to FIG. 7B, the receiver logic 115 may receive the grant, including a number of grant indications at diamond 360. Specifically, to determine whether or not a grant is received at the receiver logic 115, a check may be made at the diamond 360. Until grant is received from the transmitter logic 125, the receiver logic 115 may continue to iterate detecting receipt of any grant from the transmitter logic 125 in some embodiments of the present invention. When a grant becomes available at the diamond 360, another check at diamond 362 may determine whether the load count is within the EEDP range in which every single grant that the receiver logic 115 receives, the receiver 75(1) ideally accepts all the received grant indications from this point on in one embodiment.

In other words, when the receiver 75(1) detects that a certain number of additional words of a packet are to be received, every single grant indication that arrives from the transmitter logic 125 may be accepted. At block 366, in turn, the receiver logic 115 takes priority for the random access memory (RAM) resource. The RAM resource availability in one embodiment refers to the physical RAM that is not available at this particular moment, as being accessed by a different virtual channel (VC) thread.

The RAM resource availability may be determined at diamond 364 as shown in FIG. 7B. When the RAM resource becomes available, at block 368, the receiver logic 115 may send a word and decrement the load count, indicating the packet words remaining for the received packet (e.g., the inbound packet 35*a*). A check at diamond 370 may indicate whether the word to be sent is the last word of the received packet. If so, the receiver logic 115 prepares for the next virtual channel thread as shown in block 372*a* in one embodiment. Otherwise, the receiver logic 115 may wait for the grant to arrive, including one or more grant indications for the received packet at the diamond 360.

Referring back to FIG. 7A, when the received packed at the diamond 354 is indicated to be a short packet, another check at diamond 380 may ascertain whether the RAM resource is available. When the RAM resource becomes available to the receiver logic 115, at block 382, the receiver logic 115 may issue the request for a packet relay for the short packet with the packet length information included therewith. In this way, the short packet may be sent to the destination, for example, to the transmitter logic 125 shown in FIG. 1A.

Figure 7C:
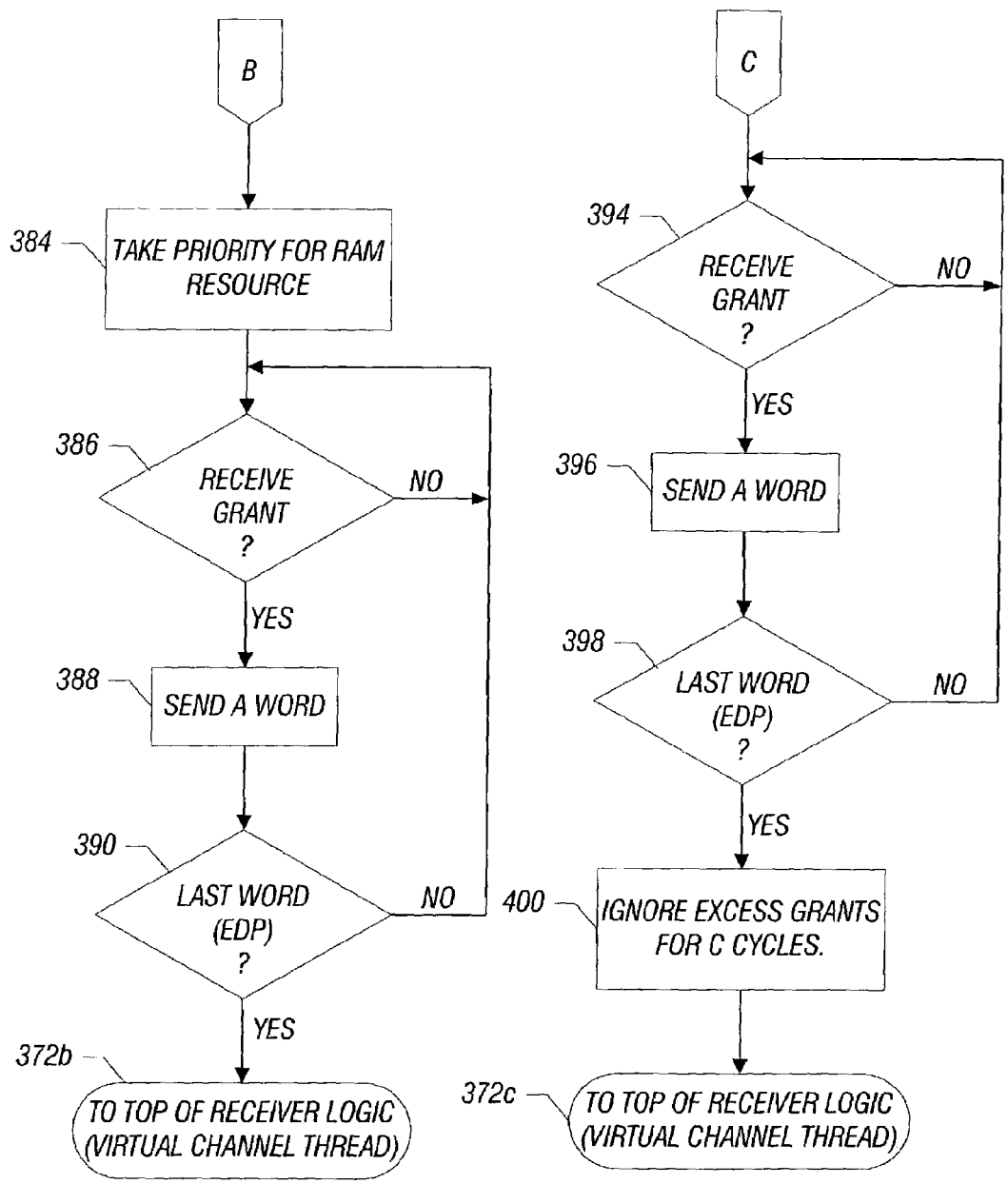
FIG. 7C is a flow chart for one execution thread of a single virtual channel corresponding to the receiver logic in the switch shown in FIG. 1A in accordance with one embodiment of the present invention.

Referring now to FIG. 7C, at block 384, the receiver logic 115 may take priority for the RAM resource. Again, at block 386, receipt of a grant from the transmitter 85(1) may be determined. When the grant is indicated to be available to the receiver 75(1), the receiver logic 115 may send a word at block 388. For the short packet, a check at diamond 390 may indicate whether the last word is to be sent. That is, the end of the received data packet may be determined at the diamond 390. If the check at the diamond 390 indicates that the last word of the short packet is sent, the receiver logic 115 at block 372b may become available for the next virtual channel thread, in some embodiments of the present invention.

As shown in FIG. 7A, for the short packet case, if the RAM resource is indicated to be unavailable at the diamond 380, then at block 392 a standard relay request may be issued to the destination, such as to the transmitter 85(1). Turning now to FIG. 7C, a check at diamond 394 may again determine whether a grant has been received at the receiver logic 115. If so, a word for the short packet may be sent at block 396. Another check at diamond 398 may determine whether the word being sent is the last word, indicating the end of the data for the received short packet. If that is the case, at block 400 the receiver logic 115, in one embodiment, may ignore the excess grant indications for the corresponding number clock (C) cycles.

However, if the last word of the received short packet if not yet reached, the receiver logic 115 may continue to anticipate additional grant indications from the transmitter 85(1), as one example. Once the received short packet is sent in its entirety to the transmitter 85(1) from the receiver 75(1), in one embodiment, the receiver logic 115 at block 372c may get ready for the next virtual channel thread.

Figure 7D:
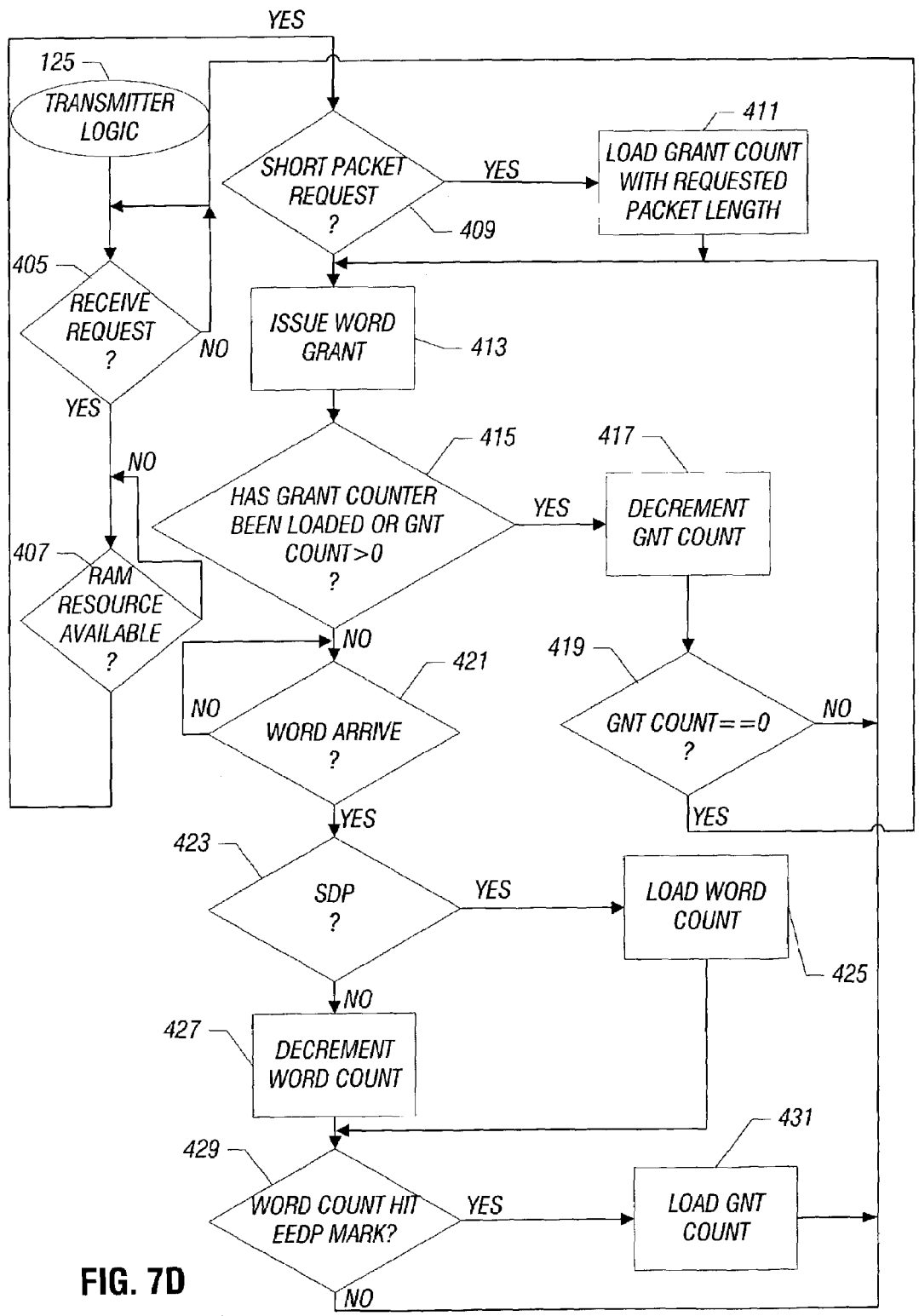
FIG. 7D is a flow chart for one execution thread of a single virtual channel corresponding to the transmitter logic in the switch shown in FIG. 1A in accordance with one embodiment of the present invention.

Referring to FIG. 7D, one execution thread corresponding to the transfer grant logic 55 shown in FIG. 1A of a single virtual channel (e.g., (VC) 105(1)) for the transmitter logic 125 is shown, according to one embodiment of the present invention. To this end, the transmitter logic 125 may use two different counters in one embodiment. The first counter may be used to keep a word count to identify an early end of the end of data packet, i.e., the EEDP in the long packet case. The second counter may be used to keep a grant (GNT) count that may be used to track the grant indications that may be necessary to complete the packet transmission for both the long and the short packet cases in some embodiments of the present invention.

In the long packet case, the receiver 75(1) shown in FIG. 1A may elect whether to use a grant provided the EEDP has not been reached. For example, a different virtual channel may be sharing the same receiver memory 100 (e.g., the receiver random access memory (RAM)) which may need to service its own grants. However, if the EEDP is indicated or the short packet is identified, the receiver 75(1) may ideally send one word for every grant received from the transmitter 85(1) in many embodiments of the present invention.

At the transmitter 85(1), the transmitter logic 125 may receive the request for the packet relay from the receiver 75(1). A check at diamond 405 may detect whether a request for the packet relay is received at the transmitter 85(1). In one embodiment, the transmitter logic 125 may continue to detect requests for packet relay from the receiver 75(1). However, when the receiver 75(1) requests the transmitter 85(1) for a packet relay, a check at diamond 407 may determine availability of the RAM resource at the transmitter logic 125. In one embodiment, until the RAM resource becomes available at the diamond 407, the transmitter logic 125 may not operate on the request for packet relay.

A check at diamond 409 may determine whether the packet relay request from the receiver 75(1) indicates a short packet relay request. If so, at block 411, the second counter may be loaded with the grant (GNT) count corresponding to the requested packet length of the short packet in some embodiments of the present invention. Otherwise, if the packet relay request is not intended for a short packet, at block 413, the transmitter logic 125, using the first counter, may issue a corresponding word grant for the packet.

For example, the transmitter 85(1)a may issue the grant indications to the grant distributor 145 shown in FIG. 1B. For the requests as to the packet relay, the interconnect logic 35 shown in FIG. 1B may use the request distributor 143 to issue the requests from the receiver 75(1)a to the transmitter 85(1)a.

A check at diamond 415 may ascertain whether the second counter, (i.e., the grant counter) has been loaded or the grant (GNT) count is not exhausted (i.e., the grant count is still available). If so, at block 417, the transmitter logic 125 may decrement the grant count until it becomes zero as indicated by a check at diamond 419. When the grant count reaches zero, the transmitter logic 125 in one embodiment may accept another request for packet relay from the receiver logic 115.

However, if the grant counter is not loaded or the grant count finishes, a check at diamond 421 may detect arrival of a word at the transmitter 85(1), in some embodiments. Regardless, the transmitter logic 125 may iteratively accept any words that may have arrived from the receiver 75(1) at the transmitter 85(1). When the transmitter logic 125 receives the first word corresponding to the received packet, a check at diamond 423 may indicate whether the arrived word is a first word, indicating a start data packet (SDP). If so, the transmitter logic 125 may load the word counter with the word count at block 425. Conversely, the transmitter logic 125 may decrement the word count at block 427. Another check at diamond 429 may indicate when the word count hits the EEDP mark. When the word count reaches the EEDP mark, at block 431, the transmitter logic 125 may load the grant count which indicates the grant for the number of remaining words left for relay. The transmitter logic 125 may issue the word grant at the block 413 for the remaining words in the packet.

Thus, in one embodiment, a communication system may comprise a switched input/output fabric to route a packet-based input/output data communication. The communication system may further include a switch that includes a port operably coupled to the switched input/output fabric. On the port, the switch may receive an inbound packet including a packet attribute associated therewith in the packet-based input/output data communication. The switch may further include a packet relay logic operably coupled to the port to determine an indication of transfer grant for the inbound packet based on the packet attribute in order to issue a packet relay request with the indication of transfer grant that provides packet attribute information in advance of the packet attribute. Accordingly, in this embodiment, inter-packet gaps may be reduced in packet-based I/O communications.

An article comprising a medium storing instructions that, if executed, by a machine result in determining an indication of transfer grant for an inbound packet based on a packet attribute associated therewith and issuing a packet relay request with the indication of transfer grant to provide packet attribute information in advance of the packet attribute.

The article further comprising a medium storing instructions that, if executed, by a machine result in receiving the inbound packet at a switch in a packet-based data communication and, in response to the packet relay request, providing one or more packet transfer grants based on the indication of transfer grant to enable a transfer of the inbound packet to a destination port.

The article further comprising a medium storing instructions that, if executed, by a machine result in extracting the packet attribute information from the packet attribute and translating the packet attribute information into the indication of transfer grant to indicate whether or not the inbound packet is capable of using each of said one or more packet transfer grants for the transfer of the entire inbound packet to the destination port.

The article further comprising a medium storing instructions that, if executed, by a machine result in determining at the time of the packet relay request, time required to relay the inbound packet to the destination port and granting one or more bandwidth time-slots to transmit the entire inbound packet from the destination port based on the packet attribute information.

The article further comprising a medium storing instructions that, if executed, by a machine result in translating a packet length field into another field to convey a number of word grants to be issued in response to the indication of transfer grant and asserting a grant signal indicating the number of word grants at the destination port based on a number of cycles required to relay the inbound packet thereto.

The article further comprising a medium storing instructions that, if executed, by a machine result in providing a word grant indication based on the packet attribute in the indication of transfer grant, extracting at the destination port the indication of transfer grant from the packet relay request, counting a number of grants to be issued based on the indication of transfer grant, and determining whether or not the inbound packet is a long packet or a short packet based on the number of grants to be issued.

The article further comprising a medium storing instructions that, if executed, by a machine result in, in response to a long packet, waiting to receive the packet attribute of the inbound packet to initiate a transfer of the long packet to the destination port.

The article further comprising a medium storing instructions that, if executed, by a machine result in, in response to a short packet, using the indication of transfer grant to initiate a transfer of the short packet to the destination port.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining in a switch an indication of transfer grant for an inbound packet by translating a packet attribute of the packet;
   issuing in said switch a packet relay request with the indication of transfer grant to provide packet attribute information in advance of the packet attribute;
   in response to the indication of transfer grant, asserting at the destination port in said switch a grant signal to transfer the inbound packet;
   asserting at the destination port an early packet end signal for the inbound packet based on the word grant indication;
   providing in said switch a word grant indication based on the packet attribute in the indication of transfer grant;
   issuing in said switch with the packet relay request the word grant indication and a start packet signal for the inbound packet;
   comparing at the destination port the word grant indication with a count indicative of the packet attribute;
   decrementing in said switch the count until the count equals the word count indication to assert a next grant signal for a next inbound packet and to issue for the inbound packet the early packet end signal and a grant deassert signal for the inbound packet; and
   providing from the destination port a last grant signal for the inbound packet.

2. The method of claim 1 further comprising:
   receiving the inbound packet at the switch in a packet-based data communication; and
   in response to the packet relay request, providing one or more packet transfer grants based on the indication of transfer grant to transfer the inbound packet to a destination port.

3. The method of claim 2 further comprising:
   extracting the packet attribute information from the packet attribute; and
   translating the packet attribute information into the indication of transfer grant to indicate whether or not the inbound packet uses each of said one or more packet transfer grants for the transfer of the entire inbound packet to the destination port.

4. The method of claim 3 further comprising:
   determining at the time of the packet relay request, time required to relay the inbound packet to the destination port; and
   granting one or more bandwidth time-slots to transmit the entire inbound packet from the destination port based on the packet attribute information.

5. The method of claim 1 further including:
   translating a packet length field into another field to convey a number of word grants to be issued in response to the indication of transfer grant; and
   asserting a grant signal indicating the number of word grants at the destination port based on a number of cycles required to relay the inbound packet thereto.

6. The method of claim 1 further comprising:
   extracting at the destination port the indication of transfer grant from the packet relay request;
   counting a number of grants to be issued based on the indication of transfer grant; and
   determining whether or not the inbound packet is a long packet or a short packet based on the number of grants to be issued.

7. The method of claim 6 further comprising:
   in response to a long packet, waiting to receive the packet attribute of the inbound packet to initiate a transfer of the long packet to the destination port.

8. The method of claim 7 further comprising:
   in response to a short packet, using the indication of transfer grant to initiate a transfer of the short packet to the destination port.

9. The method of claim 8 further comprising:
   in response to the indication of transfer grant, asserting at the destination port a grant signal to transfer the inbound packet; and asserting at the destination port an early packet end signal for the inbound packet based on the word grant indication.

10. A device comprising:
an interface to receive in a packet-based data communication an inbound packet including a packet attribute associated therewith; and
an interconnect logic operably coupled to said interface to determine an indication of transfer grant for the inbound packet based on the packet attribute by translating the packet attribute, to issue a packet relay request with the indication of transfer grant to provide packet attribute information in advance to the packet attribute, to provide a word grant indication based on the packet attribute in the indication of transfer grant, to issue with the packet relay request the word grant indication and a start packet signal for the inbound packet, comparing at the destination port the word grant indication with a count indicative of the packet attribute, to decrement the count until the count equals the word count indication to assert a next grant signal for a next inbound packet and to issue for the inbound packet the early packet end signal and a grant deassert signal for the inbound packet, and to provide from the destination port a last grant signal for the inbound packet.

11. The device of claim 10 is a switch in which said interface includes a port to receive said packet-based data communication over an input/output link.

12. The device of claim 11, said port further comprising:
a receiver to extract from the packet attribute the packet attribute information into the indication of transfer grant;
a crossbar operably coupled to said receiver to transfer the inbound packet to a destination port; and
a transmitter to provide one or more packet transfer grants based on the indication of transfer grant to enable a transfer of the inbound packet.

13. The device of claim 12, said receiver further comprising:
a sharable memory to selectively queue the inbound packet associated with at least two virtual channels; and
a receiver logic for each said at least two virtual channels to indicate whether or not the inbound packet is capable of using each of said one or more packet transfer grants for the transfer of the entire inbound packet.

14. The device of claim 13, said switch further comprising a packet relay logic to dynamically allocate bandwidth to the inbound packet on a word-by-word basis.

15. The device of claim 14, said switch further comprising a computer readable medium, operably couplable to said packet relay logic, storing computer executable instructions executed by a computer to enable word granting in the packet relay logic.

16. An apparatus comprising:
an interface to receive in a packet-based data communication an inbound packet including a packet attribute associated therewith;
an interconnect logic operably coupled to said interface to determine an indication of transfer grant for the inbound packet based on the packet attribute and to issue a packet relay request with the indication of transfer grant to provide packet attribute information in advance to the packet attribute;
a transmitter to assert at the destination port a grant signal to transfer the inbound packet in response to the indication of transfer grant and assert an early packet end signal based on the word grant indication; and
a receiver to provide a word grant indication based on the packet attribute in the indication of transfer grant, wherein said receiver to issue with the packet relay request the word grant indication and a start packet signal for the inbound packet and said transmitter to compare at the destination port the word grant indication with a count indicative of the packet attribute decrement the count until the count equals the word count indication to assert a next grant signal for a next inbound packet and to issue a grant deassert and a last grant signal for the inbound packet.

17. A computer readable medium storing computer executable instructions that executed by a computer result in:
determining an indication of transfer grant for an inbound packet by translating a packet attribute of the packet;
issuing a packet relay request with the indication of transfer grant to provide packet attribute information in advance of the packet attribute;
in response to the indication of transfer grant, asserting at the destination port a grant signal to transfer the inbound packet;
asserting at the destination port an early packet end signal for the inbound packet based on the word grant indication;
providing a word grant indication based on the packet attribute in the indication of transfer grant;
issuing with the packet relay request the word grant indication and a start packet signal for the inbound packet;
comparing at the destination port the word grant indication with a count indicative of the packet attribute;
decrementing the count until the count equals the word count indication to assert a next grant signal for a next inbound packet and to issue for the inbound packet the early packet end signal and a grant deassert signal for the inbound packet; and
providing from the destination port a last grant signal for the inbound packet.

18. The computer readable medium of claim 17, storing instructions that executed by the computer result in:
receiving the inbound packet at a switch in a packet-based data communication; and
in response to the packet relay request, providing one or more packet transfer grants based on the indication of transfer grant to transfer the inbound packet to a destination port.

19. The computer readable medium of claim 18, storing instructions that executed by the computer result in:
extracting the packet attribute information from the packet attribute; and
translating the packet attribute information into the indication of transfer grant to indicate whether or not the inbound packet uses each of said one or more packet transfer grants for the transfer of the entire inbound packet to the destination port.

20. The computer readable medium of claim 19, storing instructions that executed by the computer result in:
determining at the time of the packet relay request, time required to relay the inbound packet to the destination port; and
granting one or more bandwidth time-slots to transmit the entire inbound packet from the destination port based on the packet attribute information.

21. The computer readable medium of claim 17, storing instructions that executed by the computer result in:
translating a packet length field into another field to convey a number of word grants to be issued in response to the indication of transfer grant; and asserting a grant signal indicating the number of word grants at the destination port based on a number of cycles required to relay the inbound packet thereto.

22. The computer readable medium of claim 17, storing instructions that executed by the computer result in:
   extracting at the destination port the indication of transfer grant from the packet relay request;
   counting a number of grants to be issued based on the indication of transfer grant; and
   determining whether or not the inbound packet is a long packet or a short packet based on the number of grants to be issued.

23. The computer readable medium of claim 22, storing instructions that executed by the computer result in:
   in response to a long packet, waiting to receive the packet attribute of the inbound packet to initiate a transfer of the long packet to the destination port.

24. The computer readable medium of claim 23, storing instructions that executed by the computer result in:
   in response to a short packet, using the indication of transfer grant to initiate a transfer of the short packet to the destination port.

* * * * *